United States Patent [19]

Hirose et al.

[11] Patent Number: 5,181,161

[45] Date of Patent: Jan. 19, 1993

[54] SIGNAL REPRODUCING APPARATUS FOR OPTICAL RECORDING AND REPRODUCING EQUIPMENT WITH COMPENSATION OF CROSSTALK FROM NEARBY TRACKS AND METHOD FOR THE SAME

[75] Inventors: Yutaka Hirose; Yutaka Yamanaka; Kazuhiro Okanoue, all of Tokyo, Japan

[73] Assignee: NEC Corporation, Tokyo, Japan

[21] Appl. No.: 513,451

[22] Filed: Apr. 23, 1990

[30] Foreign Application Priority Data

Apr. 21, 1989 [JP] Japan .................................. 1-100112
Jul. 6, 1989 [JP] Japan .................................. 1-176514

[51] Int. Cl.$^5$ .............................................. G11B 7/00
[52] U.S. Cl. ..................................... 369/48; 369/109; 369/124
[58] Field of Search ............... 369/44.25, 44.26, 44.27, 369/44.28, 44.29, 44.31, 44.32, 44.33, 44.34, 44.35, 44.36, 44.37, 44.41, 48, 49, 50, 44.11, 106, 111, 112, 109, 32, 124; 358/328, 342

[56] References Cited

U.S. PATENT DOCUMENTS

| 4,425,636 | 1/1984 | Musha et al. | 369/44.37 |
| 4,633,455 | 12/1986 | Hudson | 369/44.37 |
| 4,720,825 | 1/1988 | Kokado | 369/44.37 |
| 4,831,613 | 5/1989 | Kanda | 369/109 |
| 4,858,218 | 8/1989 | Takagi et al. | 369/109 |
| 4,870,633 | 9/1989 | Matsushita et al. | 369/48 |
| 5,023,860 | 6/1991 | Ueda | 369/44.37 |
| 5,034,940 | 7/1991 | Saito et al. | 369/124 |
| 5,050,149 | 9/1991 | Ishii et al. | 369/44.36 |

FOREIGN PATENT DOCUMENTS 61-287056 12/1976 Japan .

Primary Examiner—Tommy P. Chin
Assistant Examiner—Thai Tran
Attorney, Agent, or Firm—Sughrue, Mion, Zinn, Macpeak & Seas

[57] ABSTRACT

An apparatus and a method for reproducing a signal, free of cross-talk and intersymbol interference, from an optical recording medium. The signal reproducing apparatus and method is for use in combination with an optical source for emitting a plurality of light beams directed to a center track, which contains the information to be reproduced, and the tracks adjacent to the center track on a recording medium. The signals received from the reflections of the light beams from the adjacent tracks are processed by a frequency characteristic converter and then added to the signal from the center track to eliminate the cross-talk in the signal from the center track created by the signals from the adjacent tracks.

8 Claims, 7 Drawing Sheets

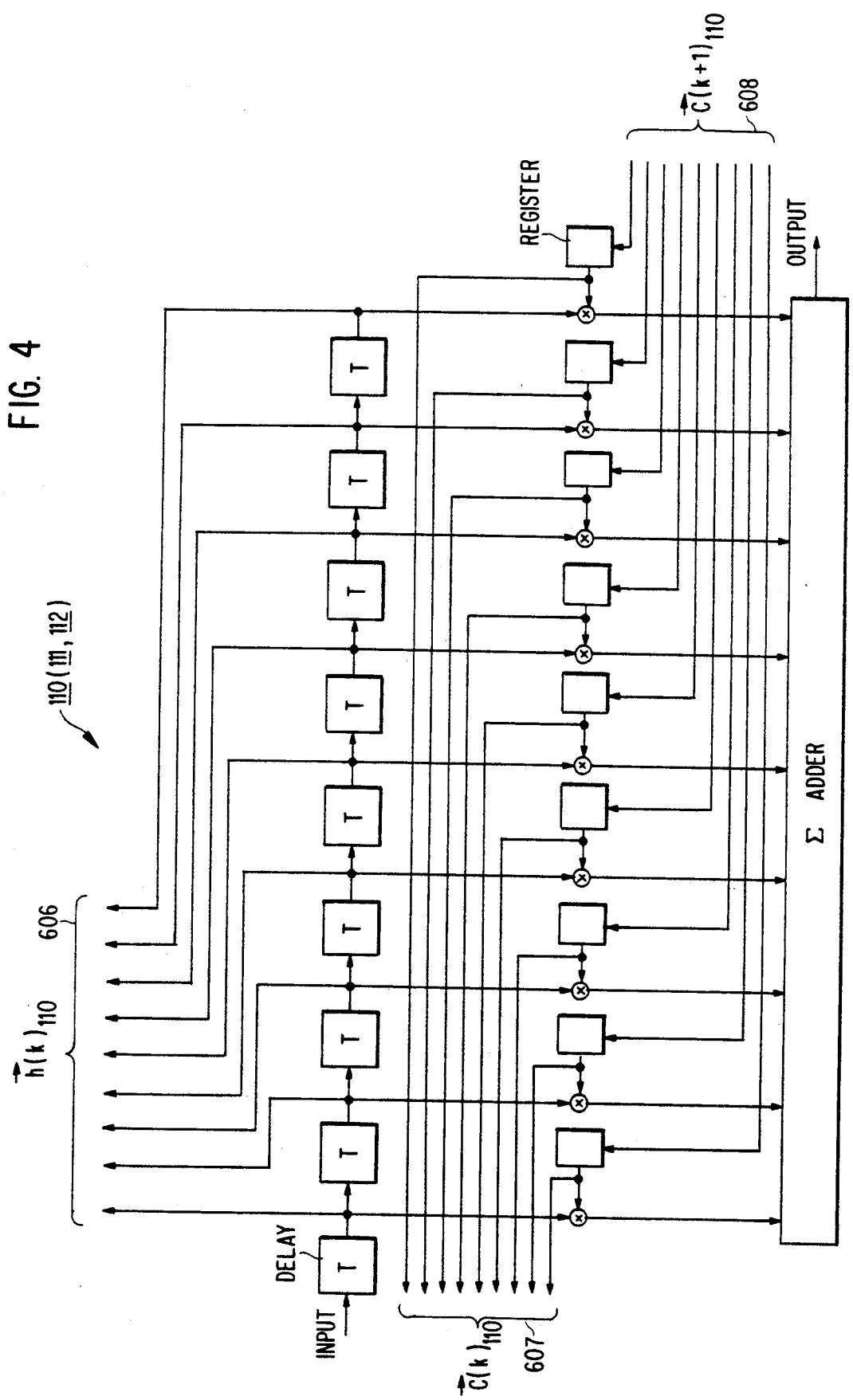

SIGNAL REPRODUCING APPARATUS FOR OPTICAL RECORDING AND REPRODUCING EQUIPMENT WITH COMPENSATION OF CROSSTALK FROM NEARBY TRACKS AND METHOD FOR THE SAME

BACKGROUND OF THE INVENTION

The present invention relates to an optical recording and reproducing apparatus which records optical information on a optical disk and reproduces the optical information therefrom by the use of an optical beam, and more particularly, to an apparatus and a method for reproducing information out of an optical recording disk. The optical disk is typically a magneto-optical medium and the information comprised data or audio/video information.

An optical recording/reproducing apparatus of this type is extensively used today because of its advantages that no physical contact is needed between an optical head for emitting a light beam and a n optical disk in recording/reproducing operations, and random access is permitted. In recording, a light beam modulated by information strikes a disk to record it in the form of pits on a track of the disk, while the recorded information is reproduced by directing a light beam to the track and sensing the variation in the intensity of a reflection.

An optical recording and reproducing apparatus of the type described is apt to suffer from crosstalk from neighboring tracks and intersymbol interference from neighboring pits on the same track during playback mode operation. Specifically, when the spot of a light beam illuminating a track is enlarged to extend over to neighboring tracks or when the center of the spot is not coincident with that of a track, crosstalk occurs. When the spot of a light beam is enlarged to illuminate neighboring pits on the same track simultaneously, intersymbol interference occurs. These problems are more serious in the event of high-density recording wherein the distance between nearby tracks and the distance between nearby pits are extremely short.

An implementation for eliminating crosstalk from neighboring tracks is disclosed in Japanese Patent Laid-Open Publication No. 61-287056. This implementation is such that pilot signals each having a different frequency are recorded on respective tracks, e.g., three tracks, beforehand. Crosstalk amounts for neighboring tracks are determined by sensing a reflection of a light beam from a desired track and the neighboring tracks. Components of the pilot signals assigned to the neighboring tracks and contained in the reflection represent the crosstalk amounts. In playback operation, three light beams are directed respectively to the desired and neighboring tracks and three optical sensors including a main sensor sense respective reflections of the light beams from the tracks to reproduce respective signals. The signals from the sensors corresponding to the tracks neighboring the desired track are controlled to produce reference levels corresponding to the amounts of crosstalk. Then, the signal from the main sensor for the desired track is processed, to produce a crosstalk-compensated reproduced signal by subtracting the reference levels from the signal from the main sensor. A problem with this prior art is that this crosstalk compensation is vulnerable to the displacement in location of light beam spots on the tracks and the fluctuation in size of the beam spots. Further, the prior art requires a more complicated structure since the pilot signal having a frequency different from that of a recorded signal should be interposed.

SUMMARY OF THE INVENTION

It is therefore an object of the present invention to provide a signal reproducing apparatus for use in optical recording and reproducing equipment, which is capable of sufficiently and adaptively eliminating crosstalk from nearby tracks even when the position of a beam spot fluctuates with respect to a desired track and even when the size of a beam spot incident to the desired track is varied.

In accordance with the present invention, in optical recording and reproducing equipment of the type using an optical head which emits a plurality of light beams onto different tracks on an optical recording disk and has a plurality of photodetectors for reproducing signals from reflections from the individual tracks, there is provided a signal reproducing apparatus comprising frequency characteristic converters respectively receiving the output signals from the photodetectors, an adder for adding converted output signals from the frequency characteristic converters to deliver a reproduced signal associated with a desired track, and converters each being capable of changing the frequency control means for adaptively controlling respective characteristics of the frequency characteristic converters so as to eliminate a crosstalk component from the reproduced signal.

The output signals of a plurality of photodetectors involving crosstalk and intersymbol interference each is fed to respective one of frequency characteristic converters (transversal filters) capable of changing the frequency characteristic independently of one another. The output of the frequency characteristic converter interconnected to the photodetector which receives a reflected light beam from a desired track is combined with the outputs of the other frequency characteristic converters interconnected to the other photodetectors which receive reflected light beams from neighboring tracks.

The frequency characteristic converter interconnected to the photodetector for the desired track also has a function to remove intersymbol interference between nearby pits.

The crosstalk from a neighboring track is ascribable to the fact that a light beam spot for reproducing a signal from the desired track has certain extent and, therefore, partly reaches a neighboring track. Signal distortion caused by the crosstalk can be readily removed if a signal stored in the neighboring track which cause the crosstalk and characteristics of the light beam are known. In accordance with the present invention, a plurality of light beams each illuminates the desired track and the neighboring tracks are applied to read signals out of these tracks, and by using the signals read out of the neighboring tracks, a replica of the crosstalk contained in a desired signal is formulated.

In practice, the replica of crosstalk formulated on the basis of the signals read out of the neighboring tracks also includes crosstalk and intersymbol interference, causing distortions. Nevertheless, the distortions of the replica are negligible because they are second-order distortions with respect to the desired signal.

These frequency characteristic converters may be implemented as an L-tap transversal filter having baud rate (T) intervals. Assuming that three light beams and, therefore, three transversal filters as the frequency characteristic converters are used, the frequency characteristics of the individual transversal filters are achieved as follows. Previously, a predetermined preamble signal is written onto a disk, and when reproducing operation is started, the preamble signal is read out first. By using a reproduced output r(k) corresponding to the preamble signal, which is produced by combining the outputs of the individual transversal filters and which involves crosstalk and intersymbol interference, and a reference signal sequence R(k) equal to the preamble signal, tap coefficients of the individual transversal filters are updated by the following equations:

$$\vec{c}(k+1)_0 = \vec{c}(k)_0 + \beta(R(k) - r(k))\vec{h}(k)_0 \quad (1)$$

$$\vec{c}(k+1)_1 = \vec{c}(k)_1 + \beta(R(k) - r(k))\vec{h}(k)_1 \quad (2)$$

$$\vec{c}(k+1)_2 = \vec{c}(k)_2 + \beta(R(k) - r(k))\vec{h}(k)_2 \quad (3)$$

where $\vec{c}(k)_0$ is a tap coefficient vector of the transversal filter associated with the desired track (the center beam) at a time k, and $\vec{c}(k)_1$ and $\vec{c}(k)_2$ are other tap coefficient vectors of the transversal filters associated with the neighboring tracks at the time k. Further, $\vec{h}(k)_0$, $\vec{h}(k)_1$ and $\vec{h}(k)_2$ are input signal vectors of the individual transversal filters, and $\beta$ is a step size. In this case, $\vec{h}(k)_i$ and $\vec{c}(k)_i$ (i=0, 1, 2) are L-dimensional vectors and these vector's elements are respectively tap coefficients and output signals from registers in the transversal filter at the time k. While the step size $\beta$ is generally determined in relation to the initial converging rate and followability required to the transversal filter, it may be selected in the range of about 0.001 to about 0.01.

By the above algorithm, when a sufficiently long preamble signal is used as a comparative signal, the tap coefficients of the individual transversal filters are so selected as to minimize the square error between R(k) and r(k). Furthermore, if the correlation between the preamble signal stored in the desired track and the preamble signals stored in the neighboring tracks is low enough, the characteristics of the transversal filters associated with the neighboring tracks are set such that the crosstalk from the neighboring tracks is cancelled. Since the reproduced output r(k) is the sum of the outputs of the transversal filters, the characteristics of the transversal filters associated with the neighboring tracks are so set as to produce a replica of crosstalk components therefrom. With respect to the preamble signal, since low correlation between preamble signals of adjacent tracks is required, respective different preamble signals are previously assigned for adjacent tracks.

On the other hand, the characteristic of the transversal filter associated with the desired track is so set as to remove intersymbol interference from nearby pits on this track.

As stated above, the characteristics of individual frequency characteristic converters are set on the basis of signals read out from the desired track and the neighboring tracks, and the reproduced signal is produced by adding the outputs of the frequency characteristic converters. Hence, the reproduced signal becomes free from any crosstalk and intersymbol interference.

BRIEF DESCRIPTION OF THE DRAWINGS

The above and other objects, features and advantages will become more apparent from the following detailed description taken with the accompanying drawings in which:

FIG. 4 is a schematic block diagram showing a construction of a frequency characteristic converter shown in FIG. 2;

DESCRIPTION OF THE PREFERRED EMBODIMENTS

Figure 1:
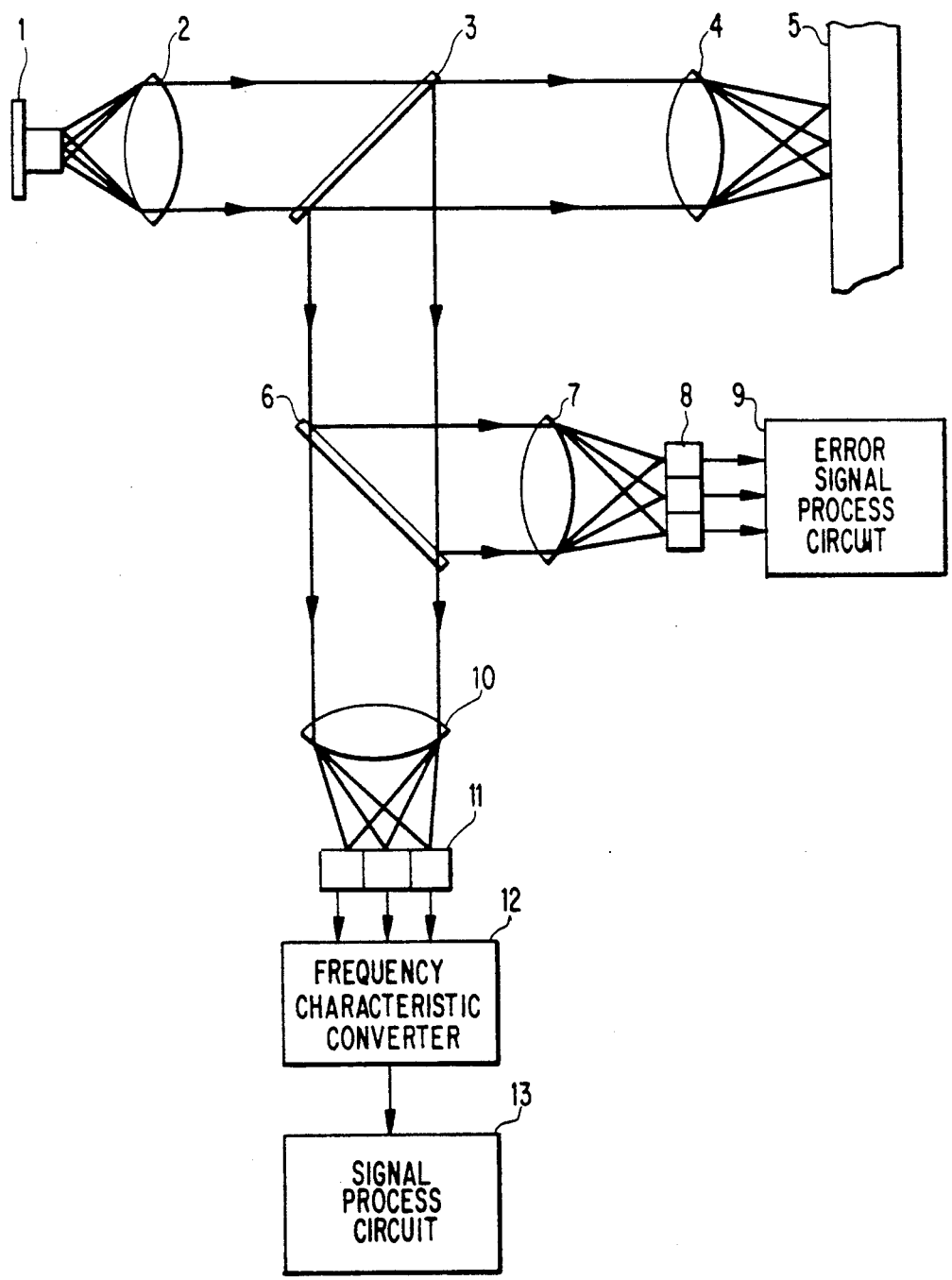
FIG. 1 is a block diagram schematically showing a preferred embodiment of the present invention.

Referring to FIG. 1 showing a first embodiment of the present invention, a semiconductor laser array 1 emits three laser beams which are drivable independently of each other. The three laser beams are directed to different tracks on a recording medium (disk) 5 at the same time by way of a collimating lens 2 and a condensing lens 4 through a beam splitter 3. In a recording mode, the individual beams are modulated in intensity independently of one another to record data on their associated tracks.

The use of a plurality of light beams is a common practice with multi-track optical recording and reproducing equipment which records data on a plurality of tracks at the same time. An optical head for use in such equipment is taught in, for example, "Multi-Beam Magneto-Optical disk drive for Parallel read/write operation", presented at Optical Data Storage Topical Meeting, Society of Photo-Optical Instrumental Engineers, Jan. 17-19, 1989.

In a reproducing mode, three beams reflected from the individual tracks on the disk 5 are separated by the beam splitter 3 to become incident to different photodetectors of a photodetector array 11 via a condensing lens 10. The output signals of the individual photodetectors are applied to a signal processing circuit 13 via a frequency characteristic converter 12 which features the present invention, as will be described in detail later. For tracking error detecting, the beams from the disk 5 are separated by a beam splitter 6 and then propagated through a condensing lens 7 to different photodetectors of a photodetector array 8. The outputs of the individual photodetectors of the array 8 are fed to a tracking error signal processing circuit 9. Such a construction allows signals stored in the tracks to be reproduced independently of each other, while allowing error signals to be detected also independently of each other. Furthermore, it is assumed that successive three tracks on the disk 5 previously store different preamble signals.

Figure 2:
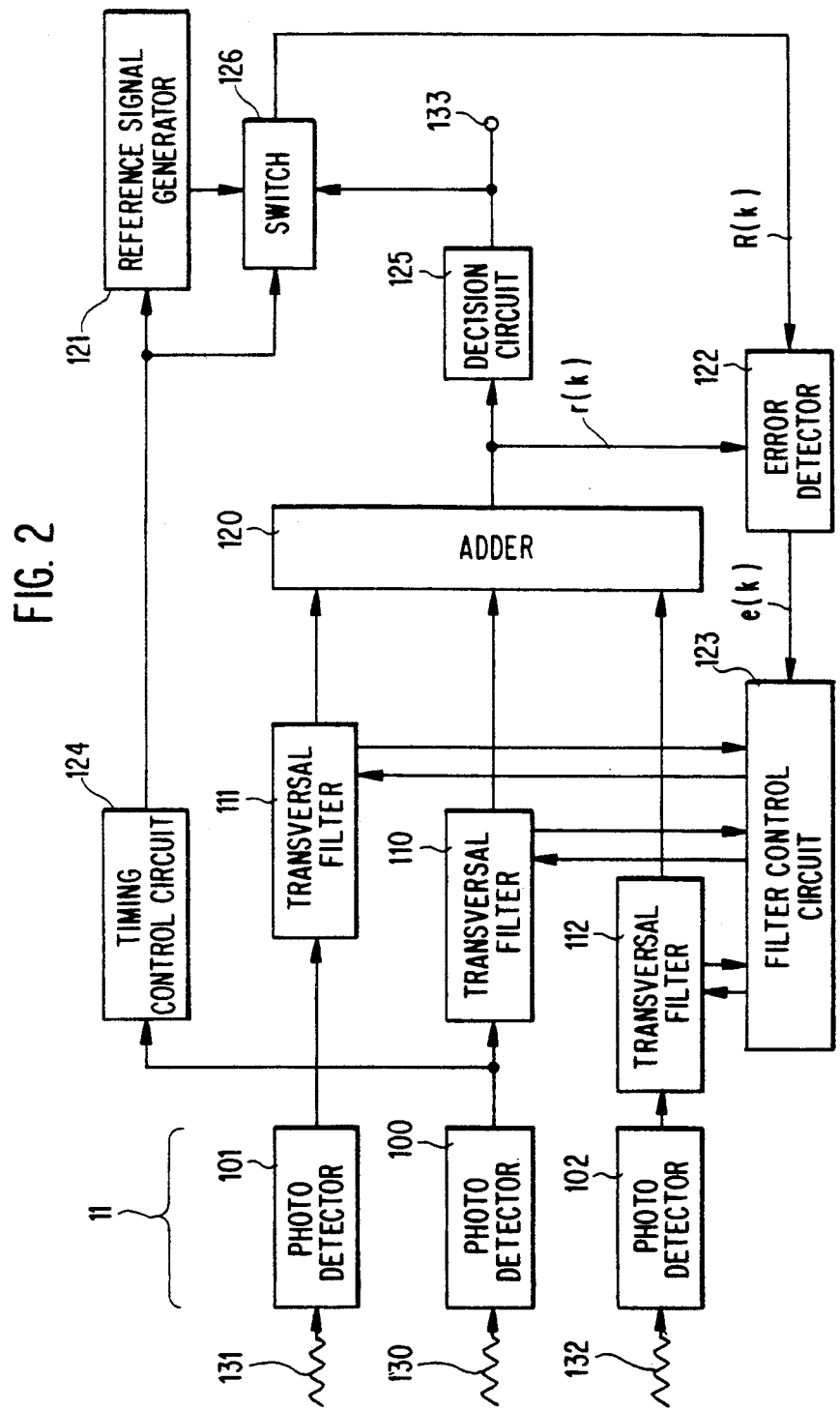
FIG. 2 is a schematic block diagram showing the construction of a frequency characteristic converter shown in FIG. 1.

FIG. 2 shows parts of the photodetector array 11 and the frequency characteristic converter 12 in detail.

There are shown in FIG. 2 a photodetector 100 associated with a desired track for reproducing a signal, photodetectors 101 and 102 associated with neighboring tracks for producing a replica of crosstalk, transversal filters 110, 111 and 112 each capable of controlling a frequency characteristic, an adder 120, a reference signal generator 121, an error detector 122, a filter control circuit 123 for controlling the filters 110 to 112, a timing control circuit 124, a decision circuit 125, a switch 126, input beams 130, 131 and 132, and an output terminal 133.

Figure 3:
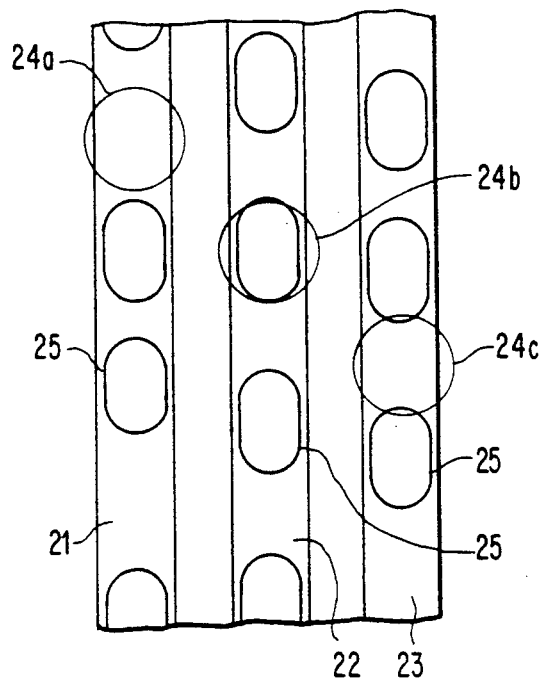
FIG. 3 is a view representative of a relationship of three tracks and light beam spots on a recording disk.

FIG. 3 indicates a relationship between the beam spots and the tracks on the disk 5. As shown, beams 24a, 24b and 24c are incident to different tracks 21, 22 and 23, respectively. The intermediate spot 24b strikes a desired track 22 to pick up a signal from the desired track, while the end spots 24a and 24c strike the neighboring tracks adjacent to the desired track in order to reproduce the replica (compensating) signals for the signal read out of the desired track. The reference numeral 25 designates pits formed on the disk 5.

Referring back to FIG. 2, operation of the present invention will be described hereinafter. The input beams 130, 131 and 132 are adjacent to the photodetectors 100, 101 and 102, respectively which perform optoelectric conversion and process to produce digitized signals for the subsequent filtering process. The output of the photodetector 100 adapted to reproduce a signal is fed to the timing control circuit 124. In response, the timing control circuit 124 detects the beginning of a preamble signal written in the track beforehand and delivers a control signal to the reference signal generator 121 and switch 126. On reception of the control signal, the switch 126 is so conditioned as to apply the output signal of the reference signal generator 121 to the error detector 122. At this instant, the reference signal generator 121 feeds a reference signal identical to the preamble signal to the switch 126. When the timing control circuit 124 detects the end of the preamble signal, it delivers a control signal to the reference signal generator 121 and switch 126. In response, the reference signal generator 121 stops outputting the reference signal while the switch 126 is so conditioned as to couple the output of the decision circuit 125 to the error detector 122. It means that the characteristic control for the transversal filters 110, 111 and 112 is sequentially performed on the basis of the preamble signal and the corresponding reference signal at a first step and, at a second step, on the basis of the input signal and the output signal of the decision circuit 125.

As shown in FIG. 4, the filters 110 to 112 may each be implemented by a 9-tap transversal filter, for example. In the filter, tap coefficient vector $\vec{c}(k)_{110}$ and input signal vector $\vec{h}(k)_{110}$ are supplied to the filter control circuit 123 and tap coefficient vector $\vec{c}(k+1)_{110}$ is received from the control circuit 123.

The signals involving the crosstalk and intersymbol interference are fed from the photodetectors 100, 101 and 102 to the filters 110, 111 and 112, respectively and the filters 110 to 112 delivers filtered resultant signals to the adder 120. At the same time, the filters 110 to 112 individually feed tap coefficient vectors $\vec{c}(k)_{110}$ to $\vec{c}(k)_{112}$ and input signal vectors $\vec{h}(k)_{110}$ to $\vec{h}(k)_{112}$ at the time k to the filter control circuit 123. The adder 120 sums the outputs of the filters 110 to 112 and delivers its output signal r(k) at the time k to the decision circuit 125 and the error detector 122. The decision circuit 125 receives the input signal, which is a digital multi-level (multi-bit) signal at each sample point, and feeds a binary signal at each sample point as a final reproduced output signal through the output terminal 133. The decision circuit 125 also supplies it's output to the switch 126. Receiving the outputs of the adder 120 and switch 126, the error detector 122 detects an error e(k):

$$e(k) = R(k) - r(k)$$

where r(k) and R(k) are respectively the outputs of the adder 120 and switch 126 at the time k. The error e(k) is fed from the error detector 122 to the filter control circuit 123. In this case, the error e(k) is obtained by inhibiting the most significant bit (MSB) in the multi-bit signal from the adder 120. Namely, the error e(k) is represented by the remaining bits except the MSB in the multi-bit signal from the circuit 120.

The filter control circuit 123 receives, at the time k, the tap coefficient vectors $\vec{c}(k)_{110}$ to $\vec{c}(k)_{112}$ and input signal vectors $\vec{h}(k)_{110}$ to $\vec{h}(k)_{112}$ from the filters 110 to 112 and the error e(k) from the error detector 122. Then, the filter control circuit 123 determines the tap coefficient vectors $\vec{c}(k+1)_{110}$ to $\vec{c}(k+1)_{112}$ at a time (k+1) as follows:

$$\vec{c}(k+1)_{110} = \vec{c}(k)_{110} + \beta e(k) \vec{h}(k)_{110} \quad (4)$$

$$\vec{c}(k+1)_{111} = \vec{c}(k)_{111} + \beta e(k) \vec{h}(k)_{111} \quad (5)$$

$$\vec{c}(k+1)_{112} = \vec{c}(k)_{112} + \beta e(k) \vec{h}(k)_{112} \quad (6)$$

wherein, $\beta$ is representative of a predetermined step size. By the equations (5) and (6), the filters 111 and 112 produce the replica of crosstalk from the neighboring tracks, in the reverse characteristic. The adder 120 therefore, removes the crosstalk. The equations (4), (5) and (6) correspond to the equations (1), (2) and (3). These tap coefficient vectors $\vec{c}(k+1)_{110}$ to $\vec{c}(k+1)_{112}$ are respectively fed to the filters 110 to 112 to control the frequency characteristics of the individual filters 110 to 112. The input signal vector $\vec{h}(k)_{110}$ ($\vec{h}(k)_{111}$, $\vec{h}(k)_{112}$) is fed to the filter control circuit 123 via terminals 606, while the tap coefficient vector $\vec{c}(k)_{110}$ ($\vec{c}(k)_{111}$, $\vec{c}(k)_{112}$) is delivered to the filter control circuit 123 via terminals 607. In response, the filter control circuit 123 outputs the tap coefficient vector $\vec{c}(k+1)_{110}$ ($\vec{c}(k+1)_{111}$, $\vec{c}(k+1)_{112}$) via terminals 608, which has been updated by the equations (4), (5), (6)), respectively.

As described above, the tap coefficient control in the transversal filters is performed on the basis of the known preamble signal and the corresponding reference signal, at the first step. At the second step, such coefficient control is done on the basis of a recorded information signal. By the coefficient control at the second step, crosstalk compensation can be adaptively performed even when operation condition is varied. Further, it should be noticed that the tap coefficient control by using the known preamble signal at the first step is not essential for the present invention. Namely, if an error rate during a reproducing process is expected to be relatively low, it is possible to omit coefficient control on the basis of a known preamble signal at the first step. In other words, it is not necessary to record a known preamble signal and sufficient coefficient control for the crosstalk compensation can be adaptively performed only by the use of the recorded information signal.

Figure 5:
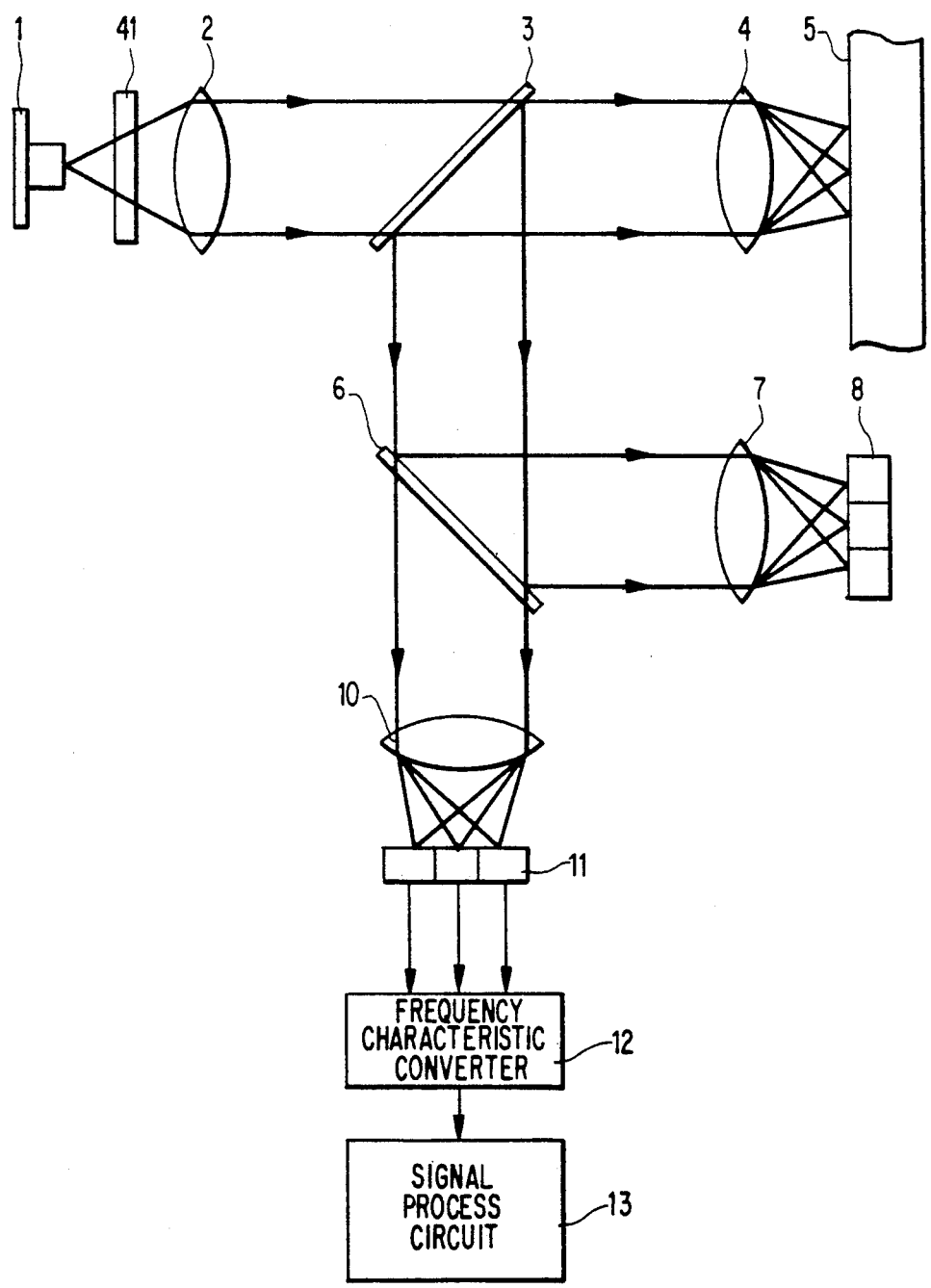
FIG. 5 is a schematic block diagram showing a second embodiment of the present invention which uses a semiconductor laser emitting a single beam and a diffraction grating.

FIG. 5 shows a second embodiment of the present invention in which a diffraction grading and a single light beam semiconductor laser are used instead of multi-light beam semiconductor laser. In the figure, the same or similar components are designated by like reference numerals as shown in FIG. 1. As shown, a single light beam emitted from the semiconductor laser 1 is supplied to a diffraction grading 41 to produce a plurality of light beams. In this embodiment, three light beams which are the zeroth-order and plus and minus first-order diffracted beams are produced. Other operations are performed in the same manner as described with FIG. 1.

Figure 7:
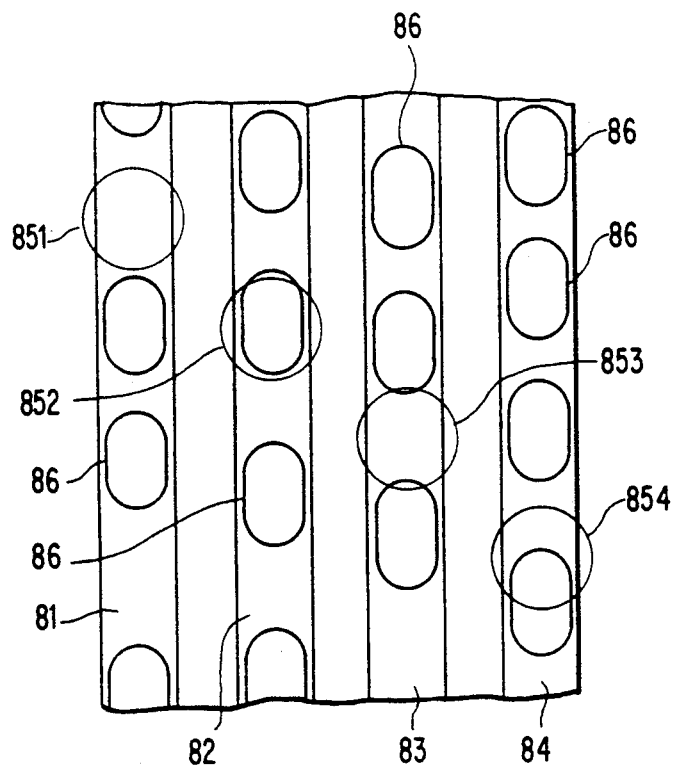
FIG. 7 is a view showing a relationship of tracks and high beam spots on a disk particular to the embodiment of FIG. 6.
Figure 6:
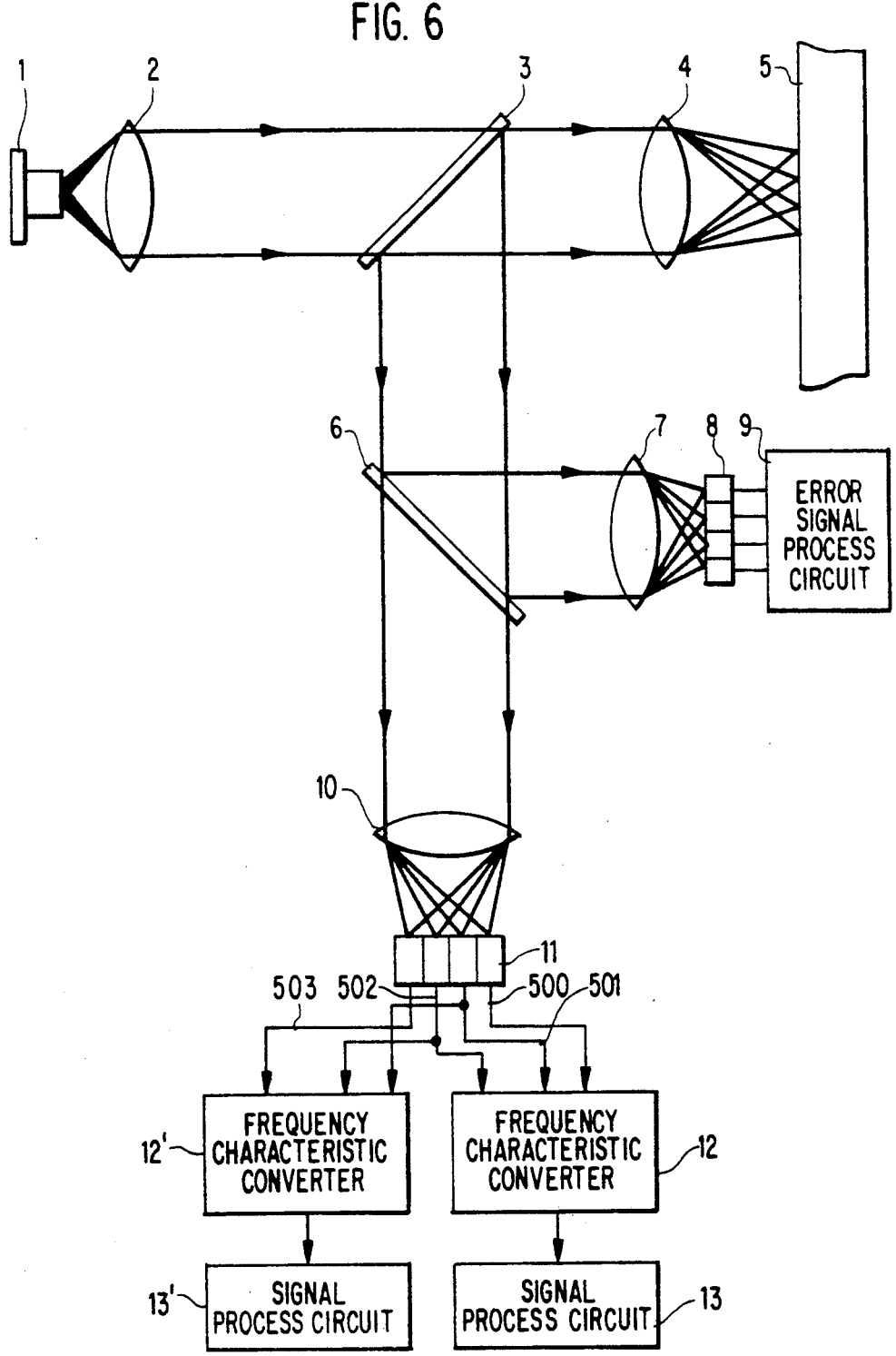
FIG. 6 is a schematic block diagram showing a third embodiment of the present invention which is implemented by a semiconductor laser emitting four beams.

FIG. 6 shows a third embodiment of the present invention in which a semiconductor laser array delivering four light beams are used. The relationship between beam spots and tracks on a disk 5 in this embodiment is shown in FIG. 7. Specifically, spots 852 and 853 are usable to reproduce signals. Therefore, the spots 851 and 853 are applied to remove crosstalk in association with the center spot 852 and the spots 852 and 854 are applied to remove crosstalk in association with the center spot 853. Since the third embodiment has the two spots for signal reproduction, two frequency characteristic converters 12, 12' each having the construction shown in FIG. 2 are used. Reflections from the spots 851, 852, 853 and 854 on tracks 81, 82, 83 and 84, respectively, each is incident to respective one of four photodetectors of a photodetector array 11. In response, the photodetector array 11 produces signals 500, 501, 502 and 503. The frequency characteristic converter 12 receives the signal 501 for reproducing a signal and the signals 500 and 502 for removing crosstalk, while the frequency characteristic converter 12' receives the signal 502 for reproducing a signal and the signals 501 and 503 for removing crosstalk. The outputs of the frequency characteristic converters 12 and 12' are fed to signal processing circuits 13 and 13'.

Figure 8:
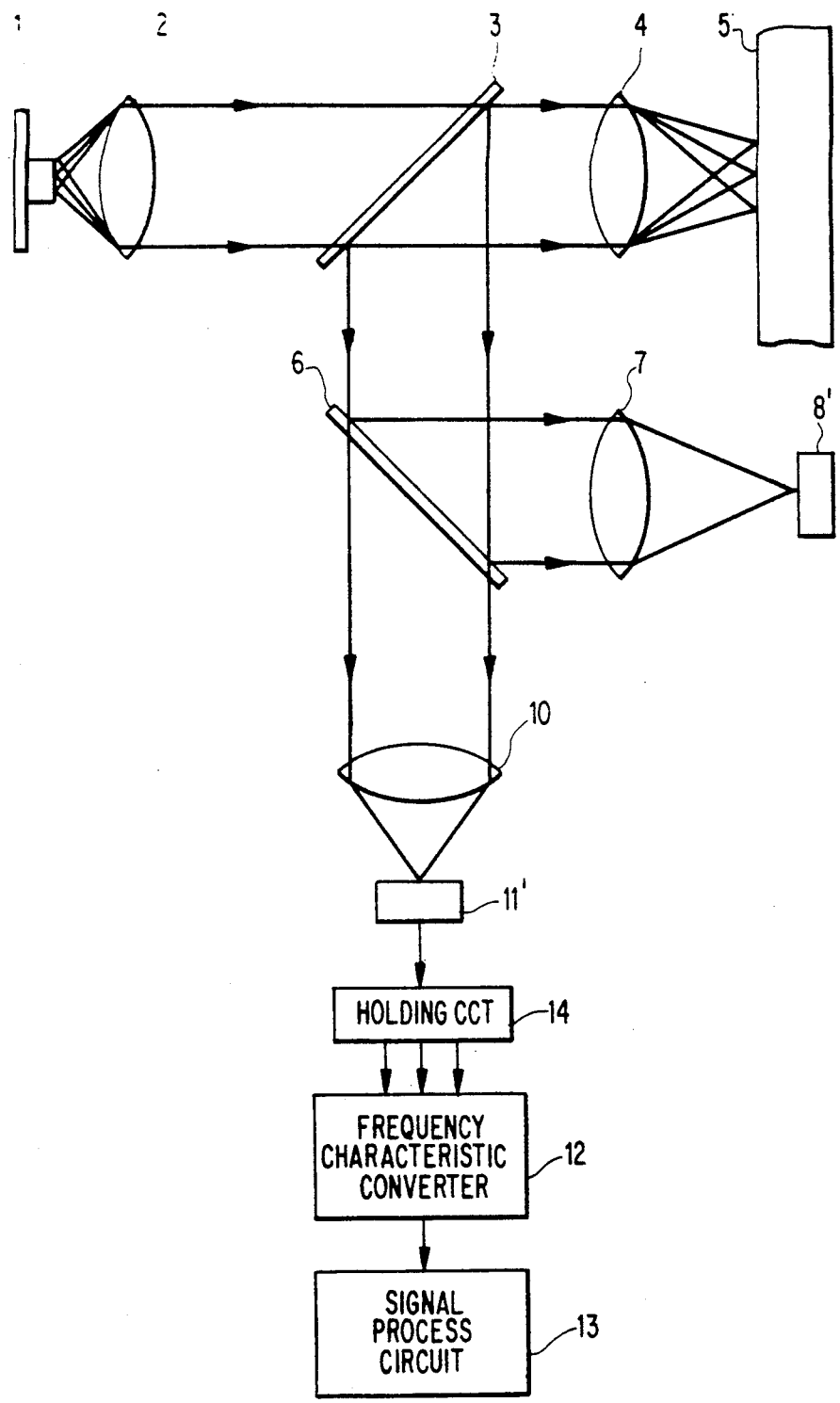
FIG. 8 is a schematic block diagram showing a fourth embodiment of the present invention which uses a single photodetector and a signal holding circuit.

FIG. 8 shows a fourth embodiment of the present invention in which a single photodetector 8' and a single photodetector 11' are used instead of the photodetector arrays of the other embodiments. Further, a holding circuit 14 for temporarily holding signals read out of individual tracks is provided before the frequency characteristic converter 12. Beam spots and tracks on a disk as the same as shown in FIG. 3. In a reproducing operation, three light sources are sequentially switched for each rotation of a disk so as to time-divisionally reproduce a signal from a desired track and signals from neighboring tracks which used for removing crosstalk. In order that all the signals necessary for the reproduction and the removal of crosstalk may be produced, a time period corresponding to three rotations of the disk is needed. The holding circuit 14, therefore, temporarily stores the signals reproduced from the individual tracks. This embodiment is successful in reducing the size of optical components, compared to the embodiments using photodetector arrays.

In summary, it will be seen that the present invention provides a signal reproducing apparatus which on adaptively eliminate the crosstalk from neighboring tracks and thereby insures desirable reproduction of a recorded signal.

What is claimed is:

1. A signal reproducing apparatus for use in combination with an optical source for emitting a plurality of light beams directed to a desired track and neighboring tracks on a recording medium and a photodetector means for receiving reflections of said light beams from said desired and neighboring tracks on said recording medium and for producing first and second signals, said desired track being between said neighboring tracks, said desired track storing information to be reproduced, said first signal being delivered from said desired track, said second signals being delivered from said neighboring tracks, said signal reproducing apparatus comprising:

a plurality of filtering means respectively receiving said first and second signals for varying frequency characteristics of said first and second signals to produce first and second characteristic-converted signals;

signal adding means for adding said first characteristic-converted signal and said second characteristic-converted signals to deliver a reproduced signal; and characteristic control means for controlling a frequency characteristic of a said plurality of filtering means in accordance with said reproduced signal.

2. A signal reproducing apparatus as claimed in claim 1, wherein said filtering means is constructed by a transversal filter.

3. A signal reproducing apparatus as claimed in claim 2, wherein predetermined preamble signals are recorded in said desired and neighboring tracks on said recording medium; and said filtering means operates in response to detection of said preamble signal contained in said reproduced signal.

4. A signal reproducing apparatus as claimed in claim 3, wherein said characteristic control means comprises:

means for generating a reference signal corresponding to said preamble signal associated with said desired track;

means for detecting an error between said reference signal and said preamble signal contained in said reproduced signal; and means for controlling tap coefficients in said transversal filter in response to said error.

5. A signal reproducing apparatus as claimed in claim 2, further comprising decision means receiving said reproduced signal from said signal adding means for delivering a binary signal representative of said information recorded in said desired track, wherein said characteristic control means comprises:

means for calculating an error between said reproduced signal and said binary signal, and means for controlling tap coefficients in said transversal filter in response to said error.

6. A signal reproducing method for an optical recording and reproducing system which uses an optical head for emitting a light beam onto successive adjacent three tracks on a recording disk and delivering a first signal from a first track storing information to be reproduced and two second signals from second tracks adjacent to said first track, said first and second tracks corresponding to said successive adjacent tracks, said first track being between said second tracks, comprising:

filtering said first signal by a first transversal filter to produce a first filtered signal;

filtering said two second signals by a second transversal filter to produce two second filtered signals;

adding said first and two second filtered signals to an added signal;

binarizing said added signal into a binary signal representative of said information;

comparing said binary signal with said added signal to produce an error signal; and controlling characteristics of said first and second transversal filters in response to said error signal.

7. A signal reproducing method for an optical recording and reproducing system which uses an optical head for emitting a light beam onto successive adjacent tracks including a center track and two side tracks and delivering a first signal from said center track and two second signals from said two side tracks, said center and side tracks storing respective preamble signals, comprising:

filtering said first signal by a first transversal filter to produce a first filtered signal;

filtering said two second signals by a second transversal filter to produce two second filtered signals;

adding said first and two second filtered signals to produce an added signal;

generating a reference signal corresponding to the preamble signal stored in said center track;

comparing a picked-up preamble signal contained in said added signal with said reference signal to produce an error, said picked-up preamble signal being delivered when said optical head scans said respective preamble signals stored in said center and side tracks; and controlling characteristics of said first and second transversal filters in accordance with said error.

8. A signal reproducing apparatus for optical recording and reproducing systems which uses an optical head for emitting a plurality of light beams onto three different tracks including a central track and two neighboring tracks on a recording medium and having a plurality of photodetectors for producing first and second signals corresponding to reflections from said central track and said neighboring tracks independently of each other, said apparatus comprising:

a plurality of filtering means each for varying a frequency characteristic of respective one of said first and second signals from said photodetectors independently of each other;

combining means for combining outputs of said plurality of filtering means;

deciding means for executing decision of a signal state on an output of said combining means;

preamble signal detecting means for detecting a preamble signal in said first signal associated with said center track;

reference signal outputting means for outputting a reference signal in response to an output of said preamble signal detecting means;

switch means coupled to said reference signal outputting means and said deciding means for delivering the reference signal when said preamble signal detecting means detects the preamble signal and an output of said deciding means when said preamble signal detecting means does not detect the preamble signal;

error signal outputting means for detecting an error signal out of an output of said switch means and an output of said combining means; and control means for controlling characteristics of said plurality of filtering means.

* * * * *

UNITED STATES PATENT AND TRADEMARK OFFICE
CERTIFICATE OF CORRECTION

PATENT NO. : 5,181,161
DATED : Jan. 19, 1993
INVENTOR(S) : Yutaka HIROSE et al.

It is certified that error appears in the above-identified patent and that said Letters Patent is hereby corrected as shown below:

Col. 1, line 21, delete "a n" and insert --an--.

Col. 3, line 20, delete "c" and insert --$\vec{c}$--.

Col. 3, line 26, delete "(k)$_1$" and insert --(k)$_i$--.

Signed and Sealed this

Fourth Day of January, 1994

Attest:

BRUCE LEHMAN

Attesting Officer  Commissioner of Patents and Trademarks